(12) United States Patent
Dees et al.

(10) Patent No.: US 8,303,798 B2
(45) Date of Patent: Nov. 6, 2012

(54) HYDROGEN GENERATOR DESIGNED FOR USE WITH GAS AND DIESEL ENGINES

(76) Inventors: James D. Dees, South Bend, IN (US);
Ken Colclesser, Beaumont, CA (US);
April R. Saldivar, legal representative, Beaumont, CA (US)

( * ) Notice: Subject to any disclaimer, the term of this patent is extended or adjusted under 35 U.S.C. 154(b) by 525 days.

(21) Appl. No.: 12/454,032

(22) Filed: May 11, 2009

(65) Prior Publication Data

US 2010/0282600 A1    Nov. 11, 2010

(51) Int. Cl.
*C25B 1/006* (2006.01)
(52) U.S. Cl. ........ 205/616; 204/268; 204/269; 204/270; 204/278; 204/278.5; 123/3; 205/628
(58) Field of Classification Search .................. 204/268; 205/616
See application file for complete search history.

(56) References Cited

U.S. PATENT DOCUMENTS

| 4,085,028 | A | * | 4/1978 | McCallum | 204/269 |
|---|---|---|---|---|---|
| 4,124,480 | A | * | 11/1978 | Stevenson | 204/268 |
| 4,203,821 | A | * | 5/1980 | Cramer et al. | 204/268 |
| 4,332,219 | A | * | 6/1982 | Gonzalez | 123/3 |
| 4,425,215 | A | * | 1/1984 | Henes | 204/258 |
| 5,231,954 | A | * | 8/1993 | Stowe | 123/3 |
| 6,689,271 | B2 | * | 2/2004 | Morkovsky et al. | 205/757 |
| 2004/0226830 | A1 | * | 11/2004 | Ovshinsky et al. | 205/638 |
| 2007/0080070 | A1 | * | 4/2007 | Klein et al. | 205/628 |

* cited by examiner

*Primary Examiner* — Harry D Wilkins, III
*Assistant Examiner* — Bryan D. Ripa
(74) *Attorney, Agent, or Firm* — Paul B. Heynssens Attorney at Law, PLC

(57) ABSTRACT

The invention is a unit that produces Hydrogen Gas (Browns Gas (HHO)) that can be used as an assist to diesel and gas engines. The gas is produced from distilled water, using our stainless steel plate design. The patent should apply to the internal plate placement and design. The internal design of the unit allows it to produce significantly more hydrogen, drawing significantly less current or electricity from its power source. The internal design is in the placement of positive, negative and neutral plates to produce the gas.

16 Claims, 15 Drawing Sheets

HYDROGEN GENERATOR DESIGNED FOR USE WITH GAS AND DIESEL ENGINES

The invention is a unit that produces Hydrogen Gas (Browns Gas (HHO)) that can be used as an assist to diesel and gasoline engines. The gas is produced from distilled water, using our stainless steel plate design. The patent should apply to the internal plate placement and design. The internal design of the unit allows it to produce significantly more hydrogen, drawing significantly less current or electricity from its power source. The internal design is in the placement of positive, negative and neutral plates to produce the gas.

The objective of our invention is to increase the efficiency of diesel and gasoline internal combustion engines. Our primary purpose is to enrich the air that is drawn thru the air filters, thus making it more combustible and doing a better job of igniting the fuel in the combustion chambers. Due to a better burning of the fuel; less fuel is needed to do the same amount of work. That is where the efficiency comes from. We are just getting a better burn on the same fuel that is already being used. The hydrogen (HHO) is supplied to the engine along with its normal fuel and air. The engines efficiency is increased along with power. The efficiency increase is in the 20-30 percent range. The engine also emits fewer pollutants into the atmosphere as a result of burning the hydrogen and less diesel or gasoline. The remaining exhaust is cleaner as there is a more complete burn of the fuel in the combustion chambers. The carbon footprint from most engines is from the result of unburned fuel. As our process allows for a nearly 100% burn, we nearly eliminate the carbon resulting from unburned fuels. The internal design of the unit is what we wish to patent. This design relates to plate placement of positive, negative and neutral stainless steel plates.

To construct a unit you need a watertight, airtight container, we use stainless. The size of the container will vary depending on the number of cells and size of the plates needed in the application. A cell consists of a plate that will be connected to the positive terminal of a 12-volt battery, two plates that will be connected to the negative terminal of a 12-volt battery and several neutral plates. The neutral plates go between the positive and negative plates. The plate size and placement will determine the amount of hydrogen produced. A cell consists of 2 negative, 1 positive and six neutral plates. Place three neutral plates on each side of the positive plate. Each cell has one positive plate. The negative plates are double plates with ⅛ inch spacing. The plates must be insulated from each other and there should be spacing between the sides of the container and the plates. Once the plates are in, place a cover on the container and seal it. A gas outlet that a hose can be hooked to must be placed on the top of the container. Hooking a three-cell unit like is shown in the picture; to a 12 volt battery will produce enough hydrogen (HHO) to give a fuel economy increase of 20 to 30 percent increase to a diesel semi tractor. The hydrogen (HHO) gas output is fed to the air intake of the engine. Consideration should be given to passing the gas through a devise such as a water bubbler to prevent any possibility of a flash back from an engine backfire. The solution in the container consists of distilled water with a teaspoon of potassium hydroxide. Regular tap water can be used but this tends to corrode the plates.

The attached pictures show a cell construction diagram along with pictures of how the unit is constructed and a prototype in use.

FIG. 1 is a drawing of internal plate construction of the Hydrogen Unit. The black lines 102 represent the ground plates, the common grounds are double plates with ⅛ inch spacing between them. All ground plates are hooked to a single ground point. The blue lines 104 show the neutral, or resistance plates. These are NOT hooked to any electrical potential; they become active as electricity passes through them on the way. The red lines 106 show the positive plates, each of which has its own power source.

The above shows a 3-cell unit, named for the number of positive plates. Spacing and number of neutral plates has varied. Current spacing is on ½ centers, with 3 neutral plates. The number of cells, along with plate size, varies with application.

Figure 1:
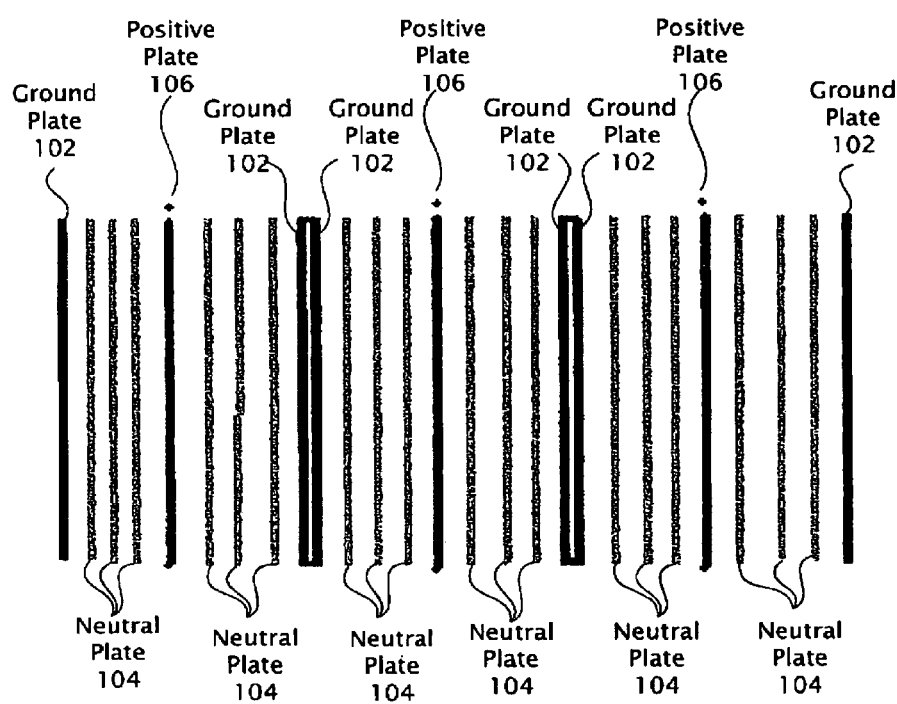
Figure 2:
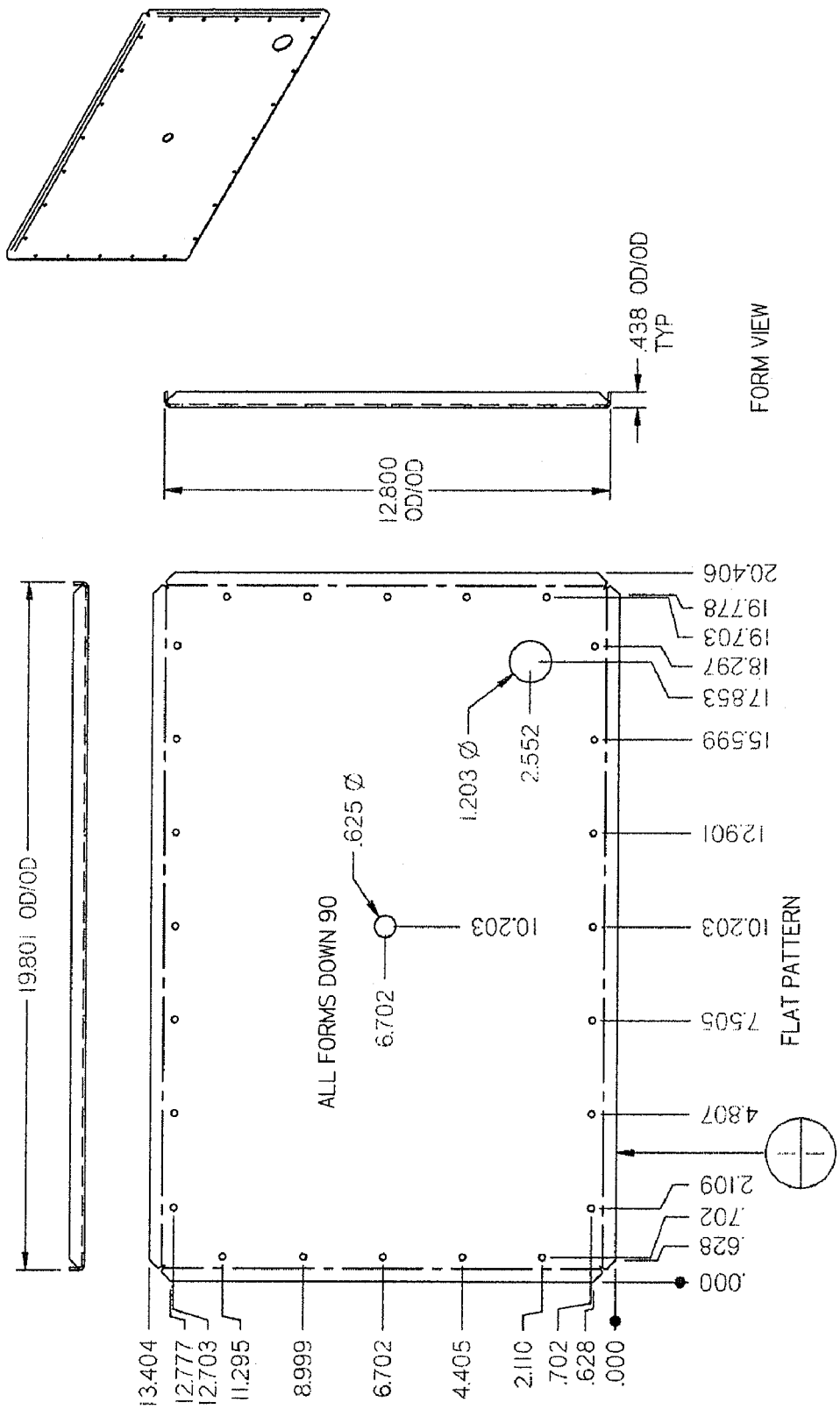
FIG. 2 through 8 shows drawings used to construct the current unit.
Figure 3:
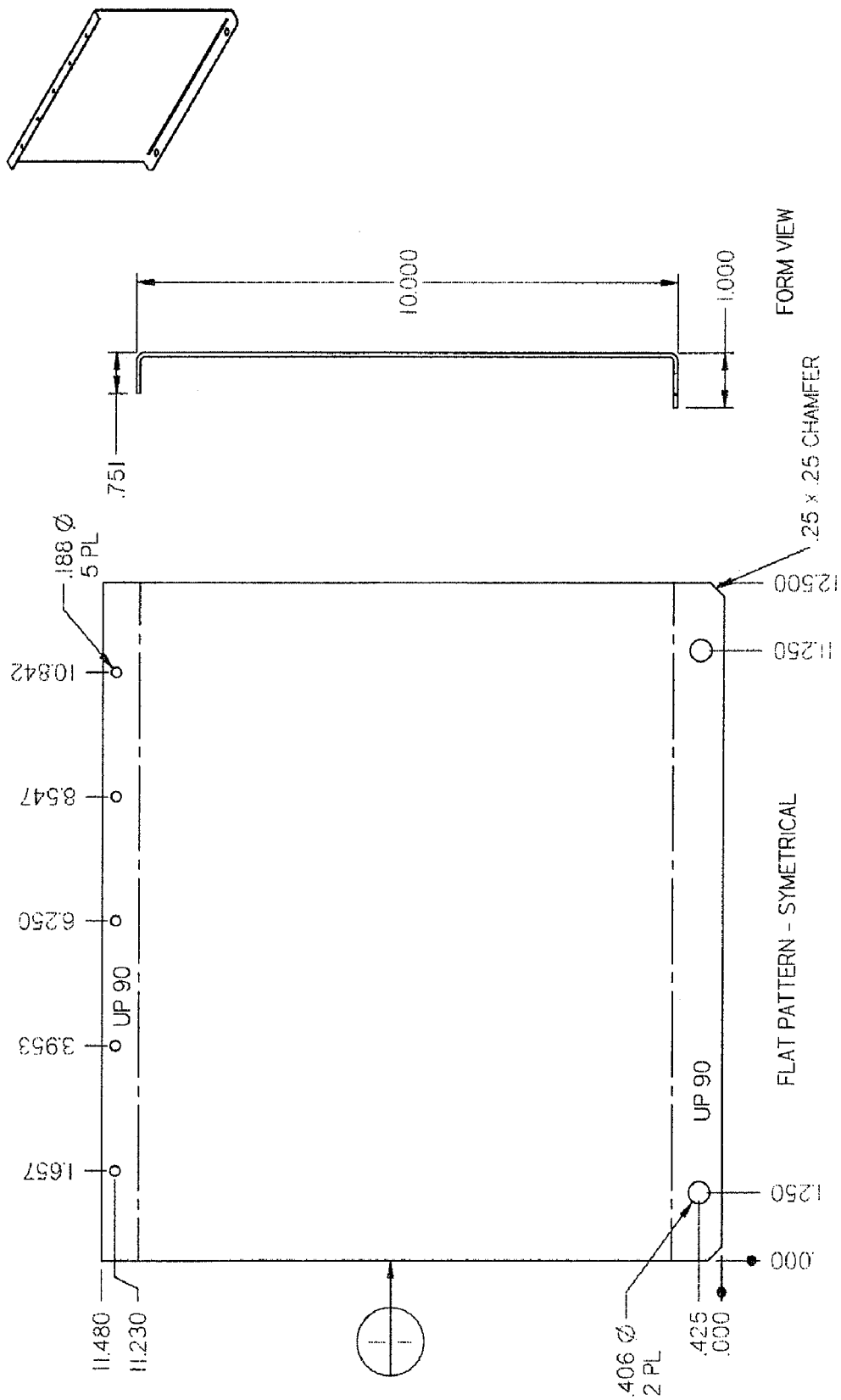
Figure 4:
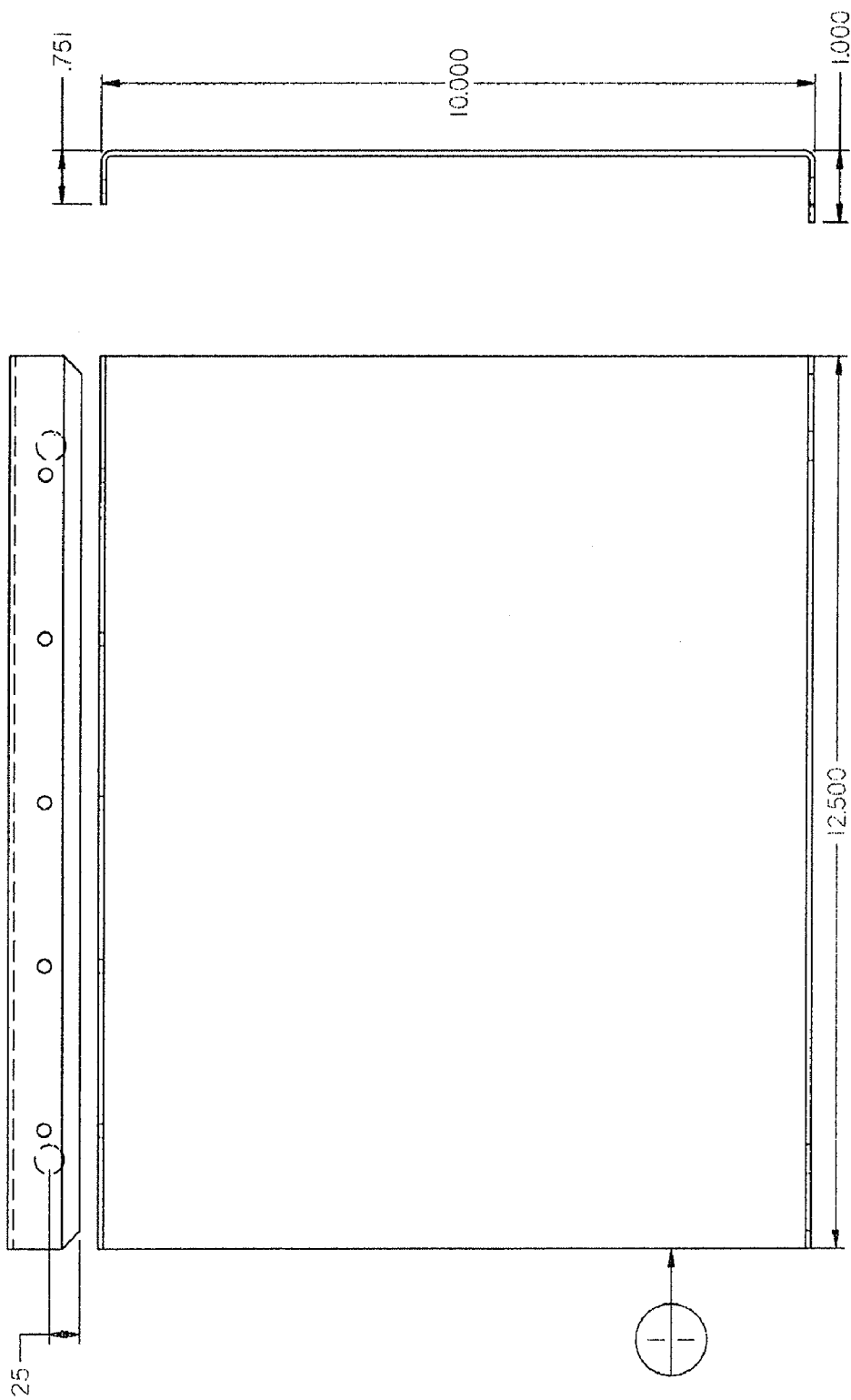
Figure 5:
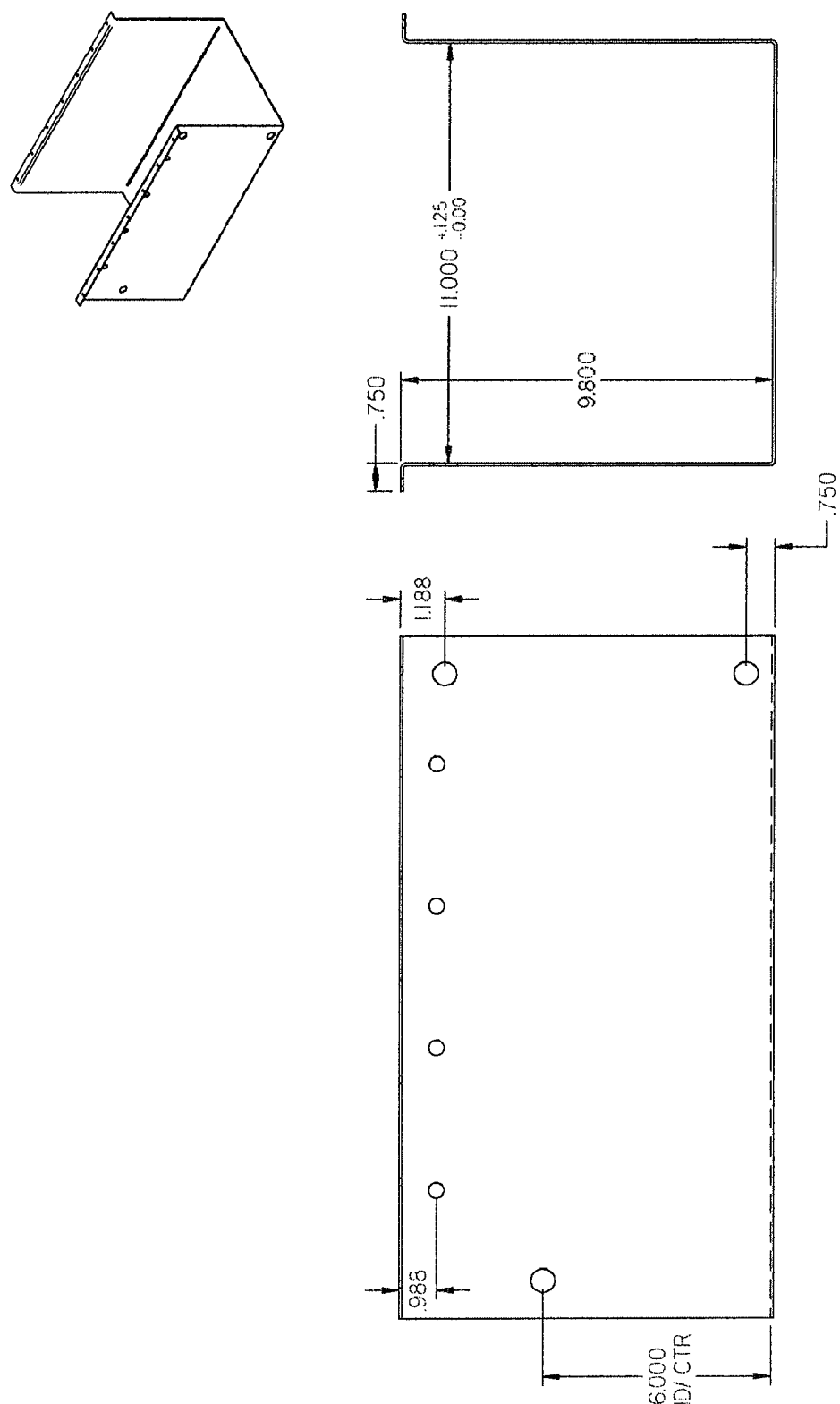
Figure 6:
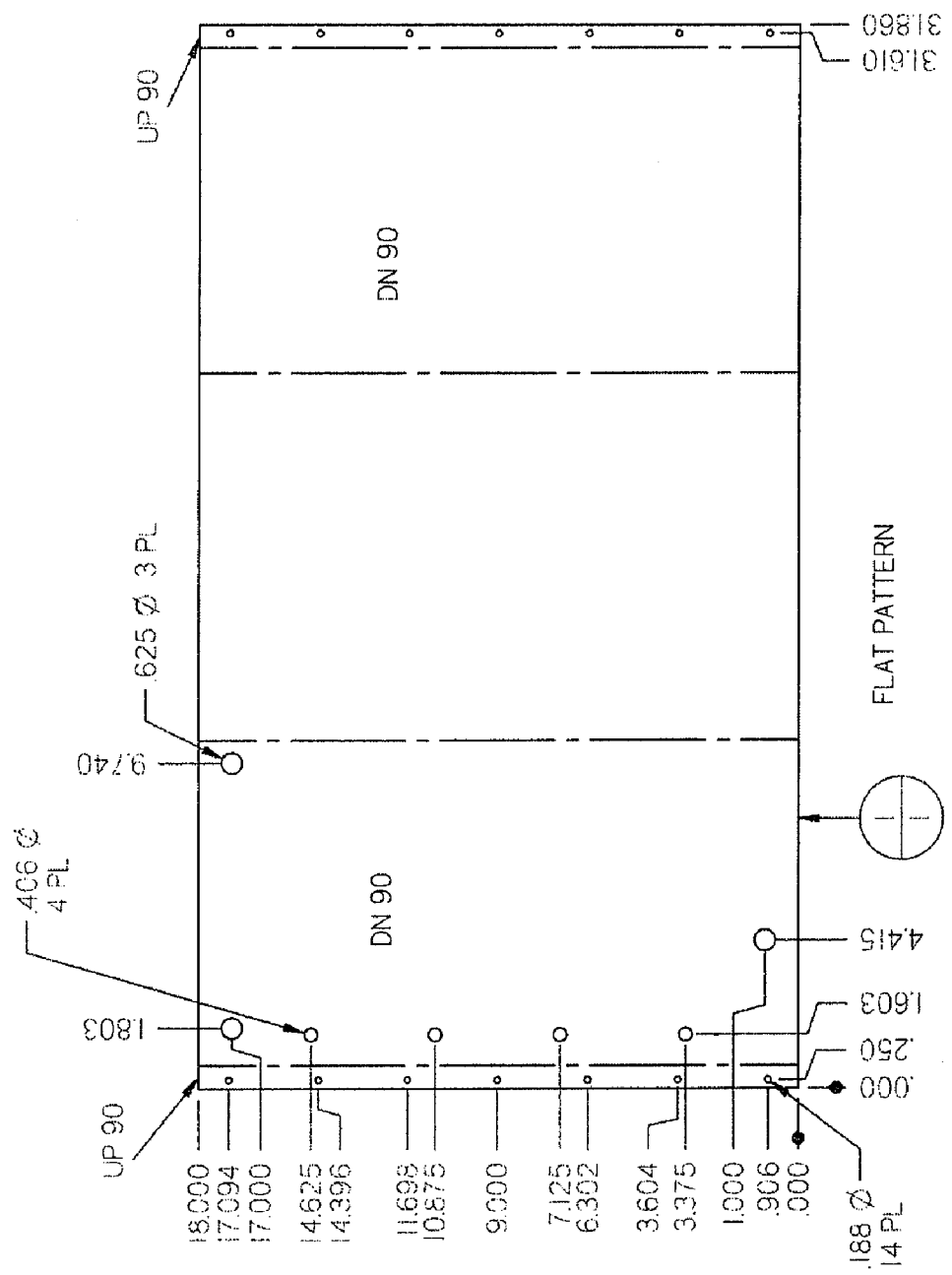
Figure 7:
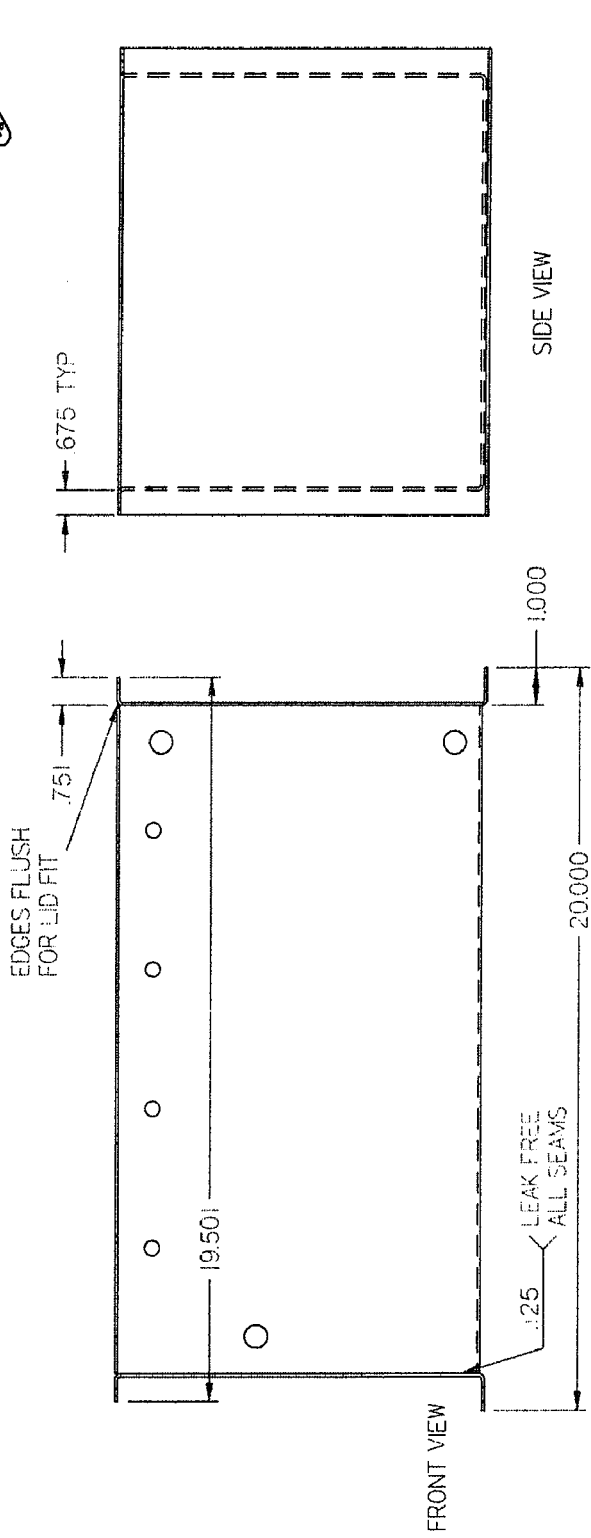
Figure 8:
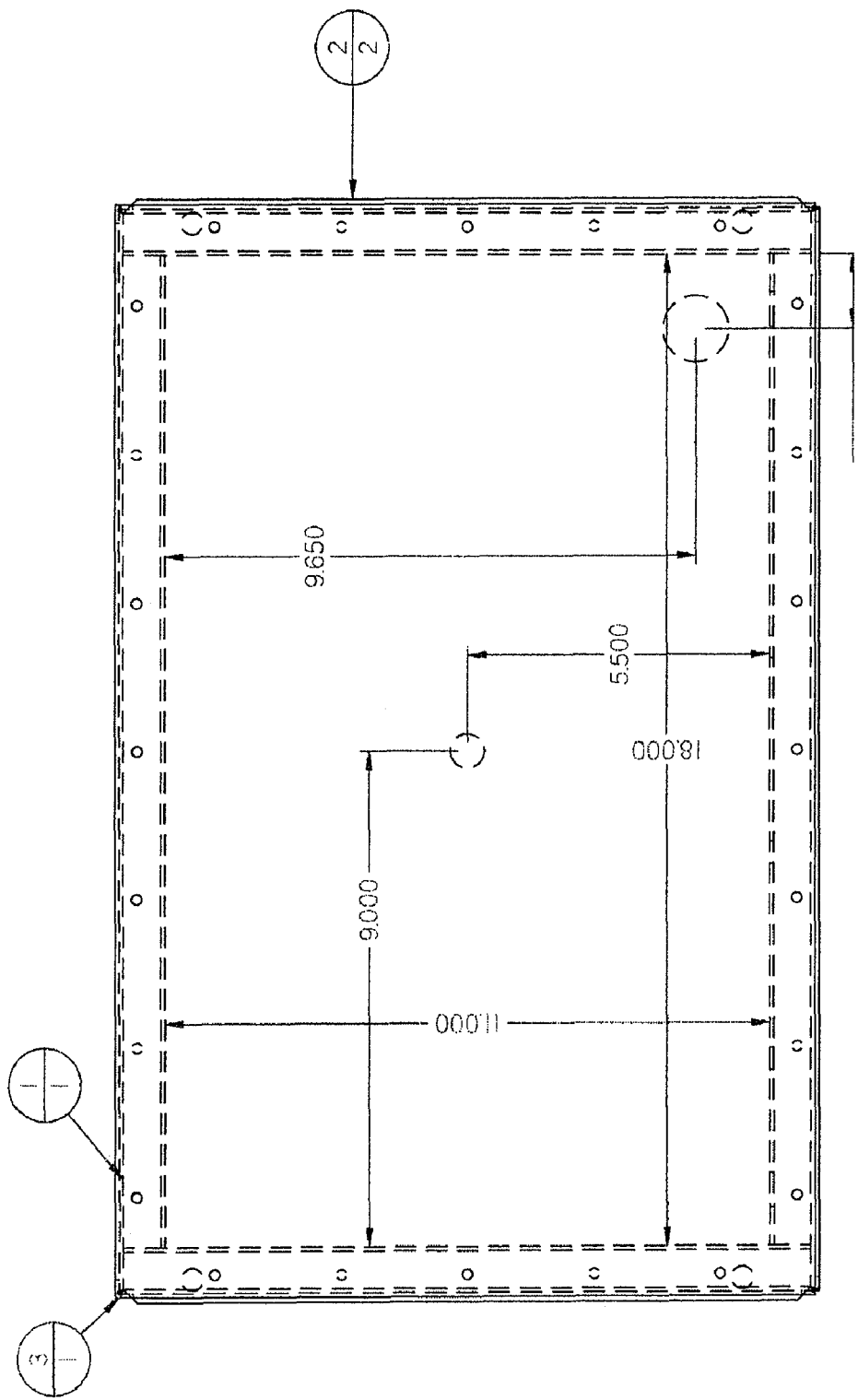
Figure 9:
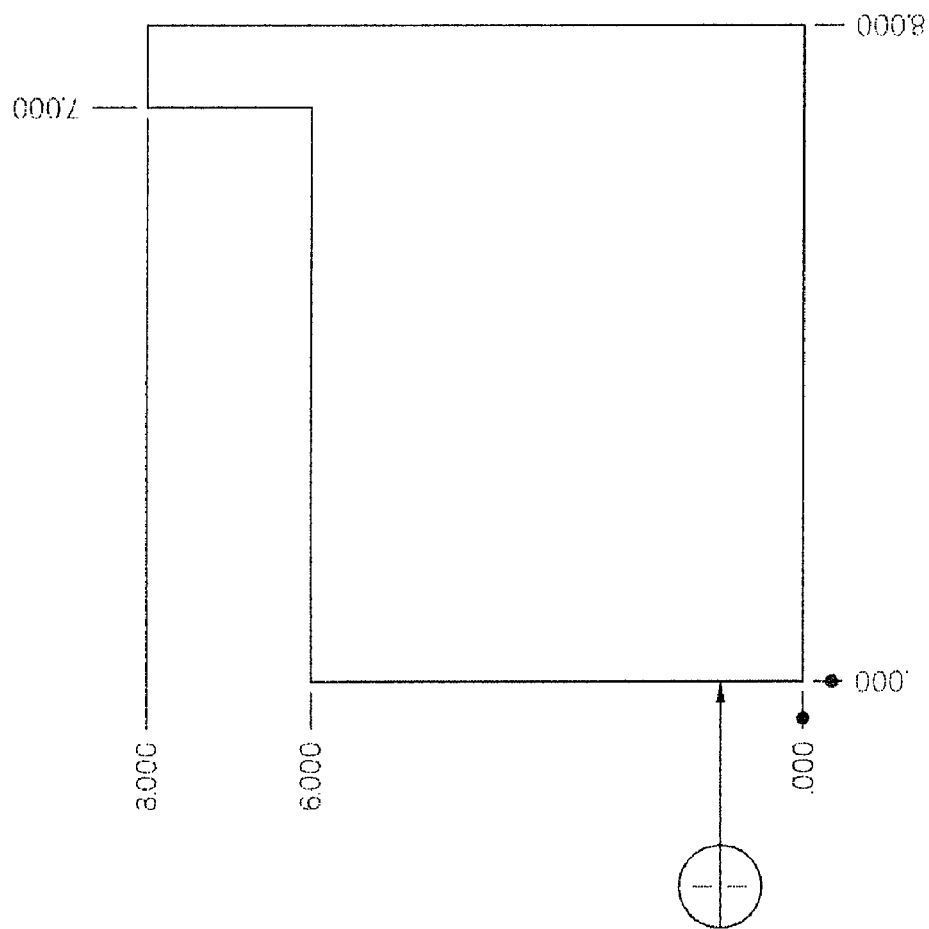
FIG. 9 through 15 shows the plates that are used to make up the cell construction.
Figure 10:
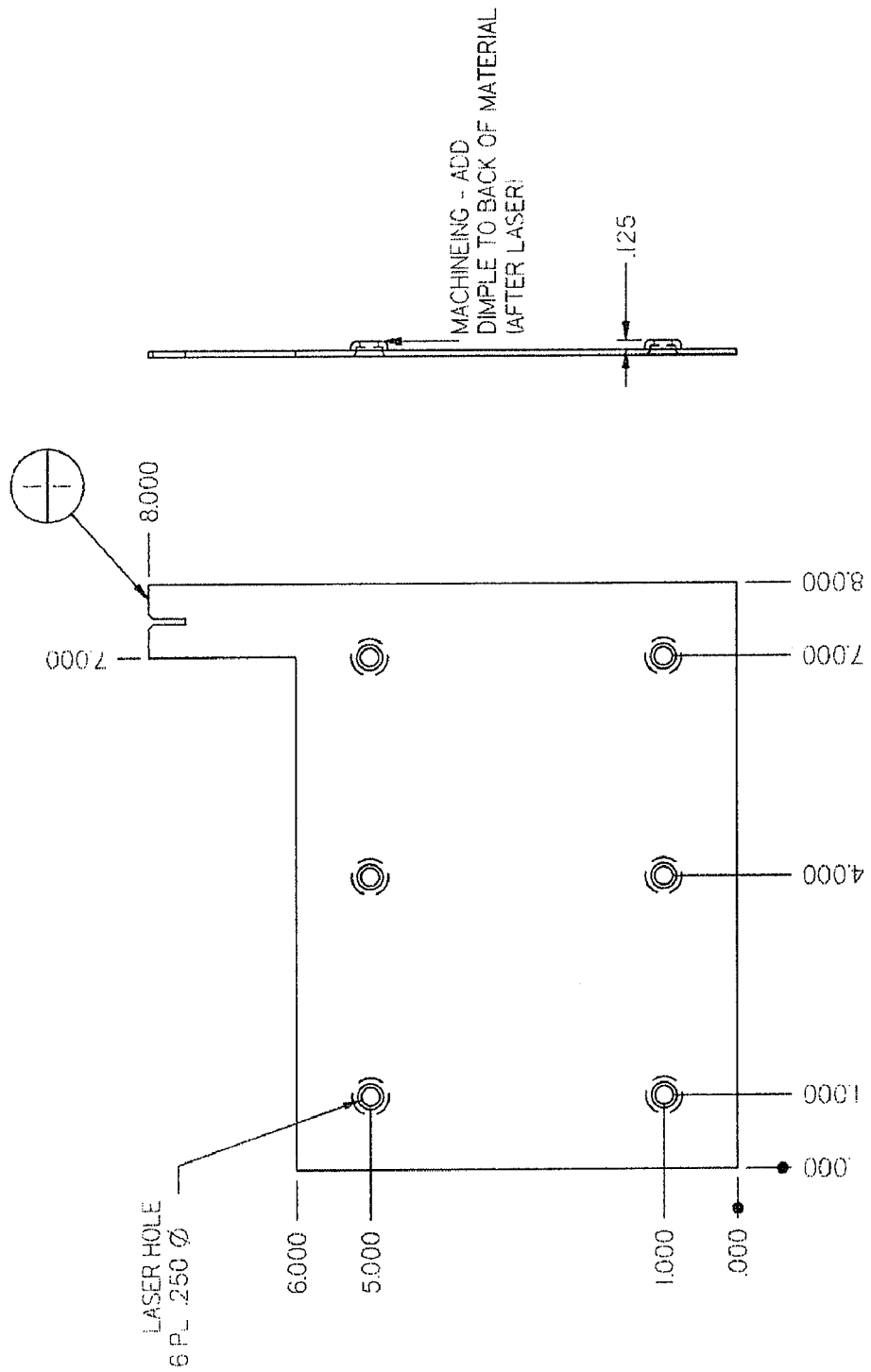
Figure 11:
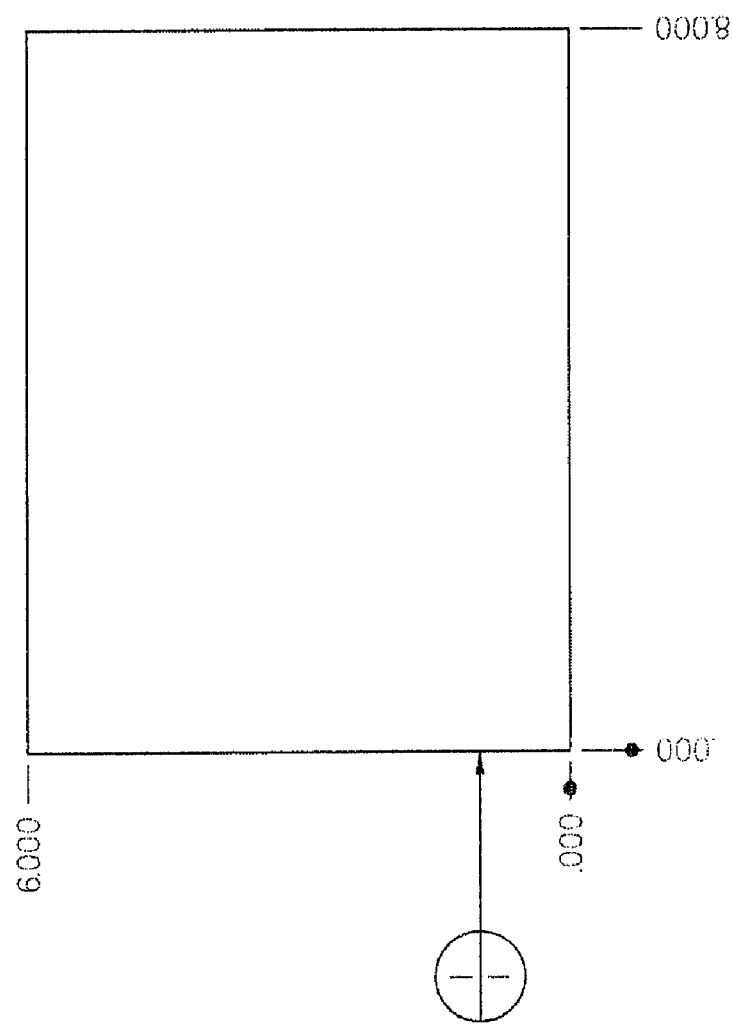
Figure 12:
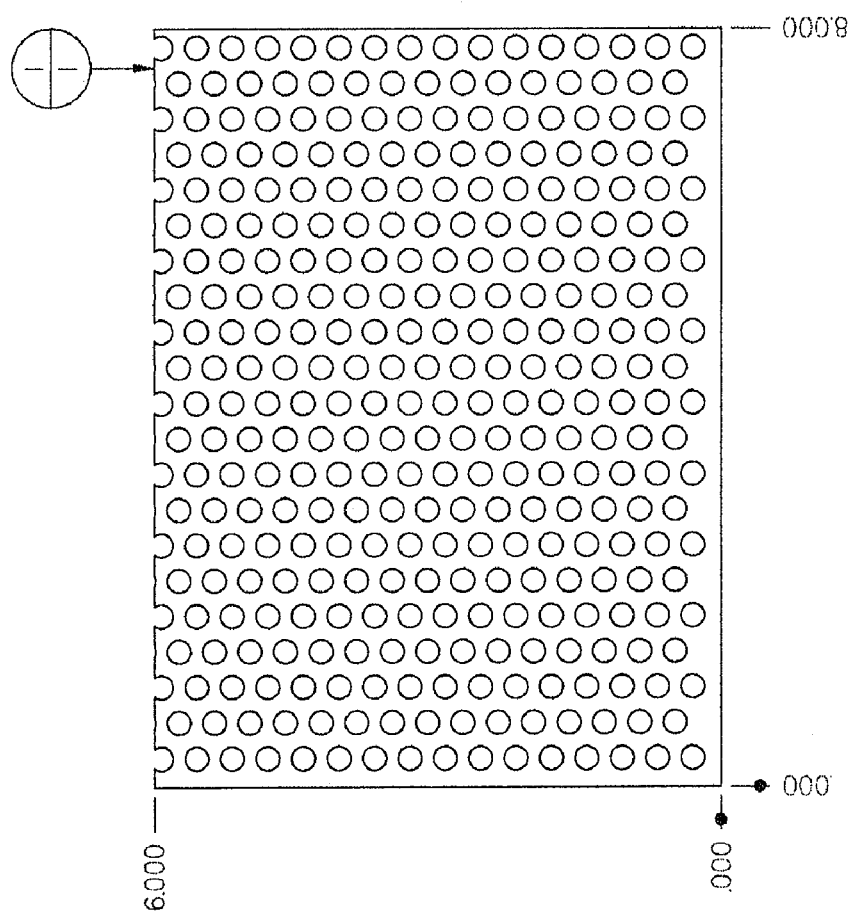
Figure 13:
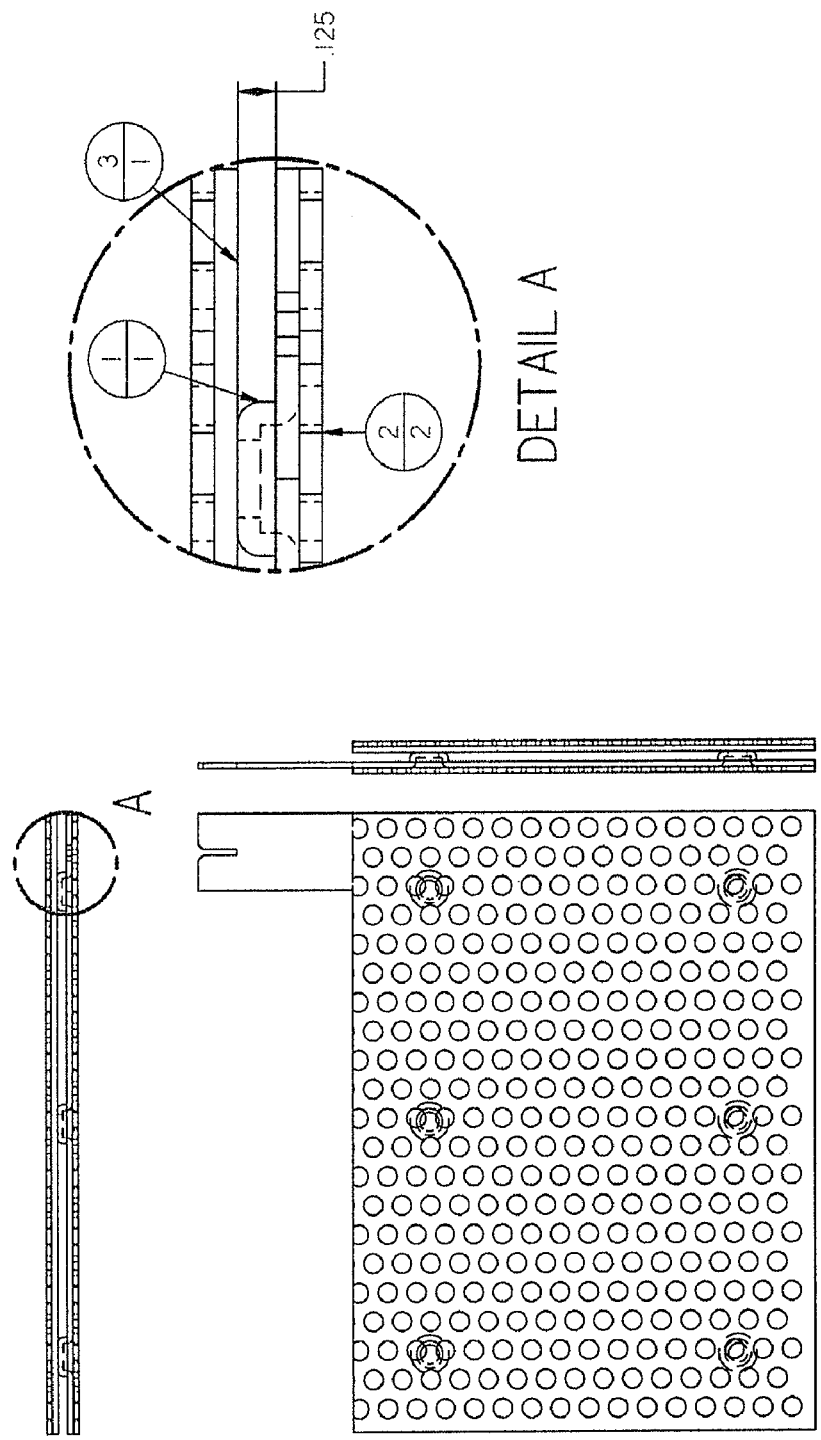
Figure 14:
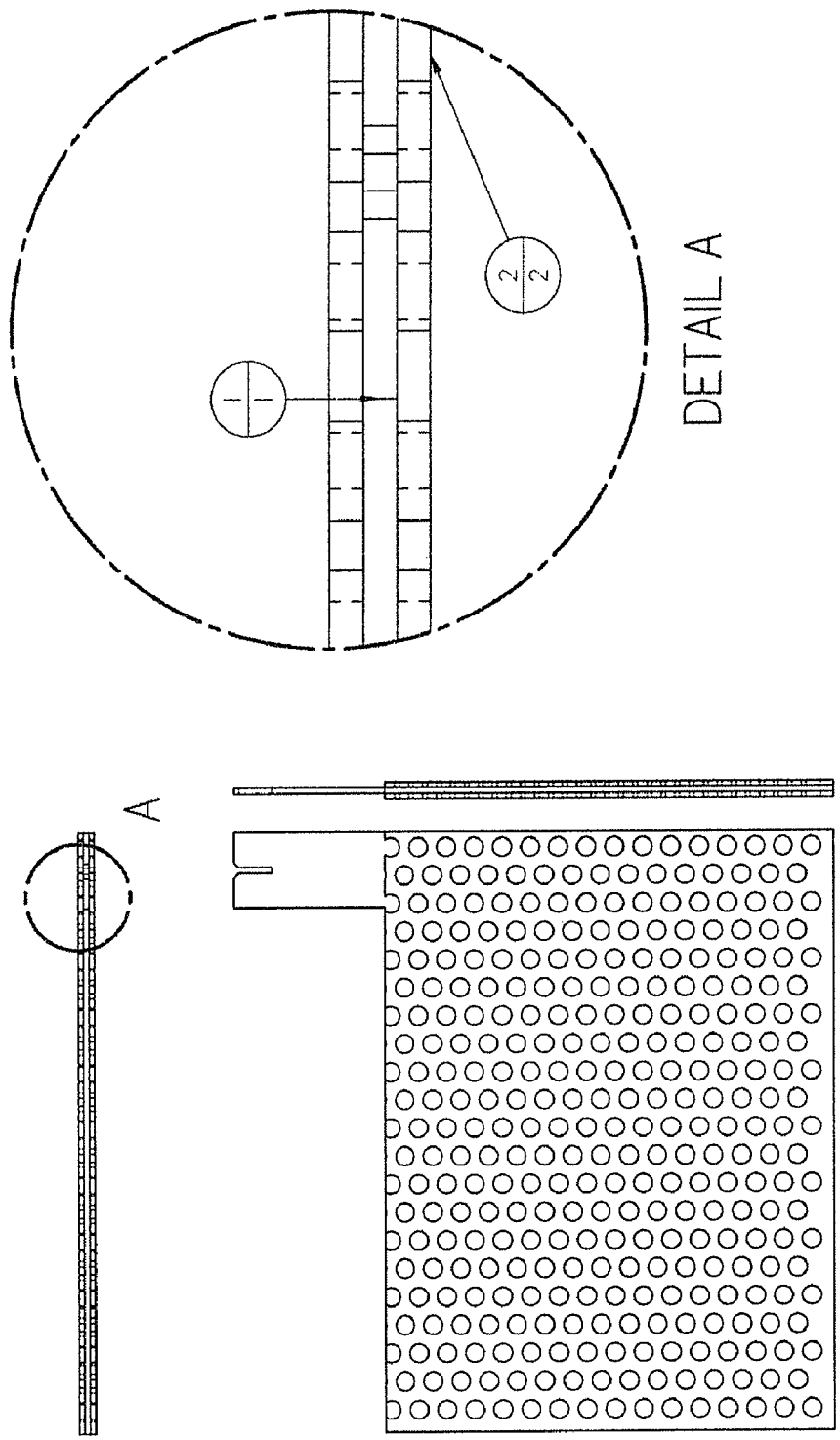
Figure 15:
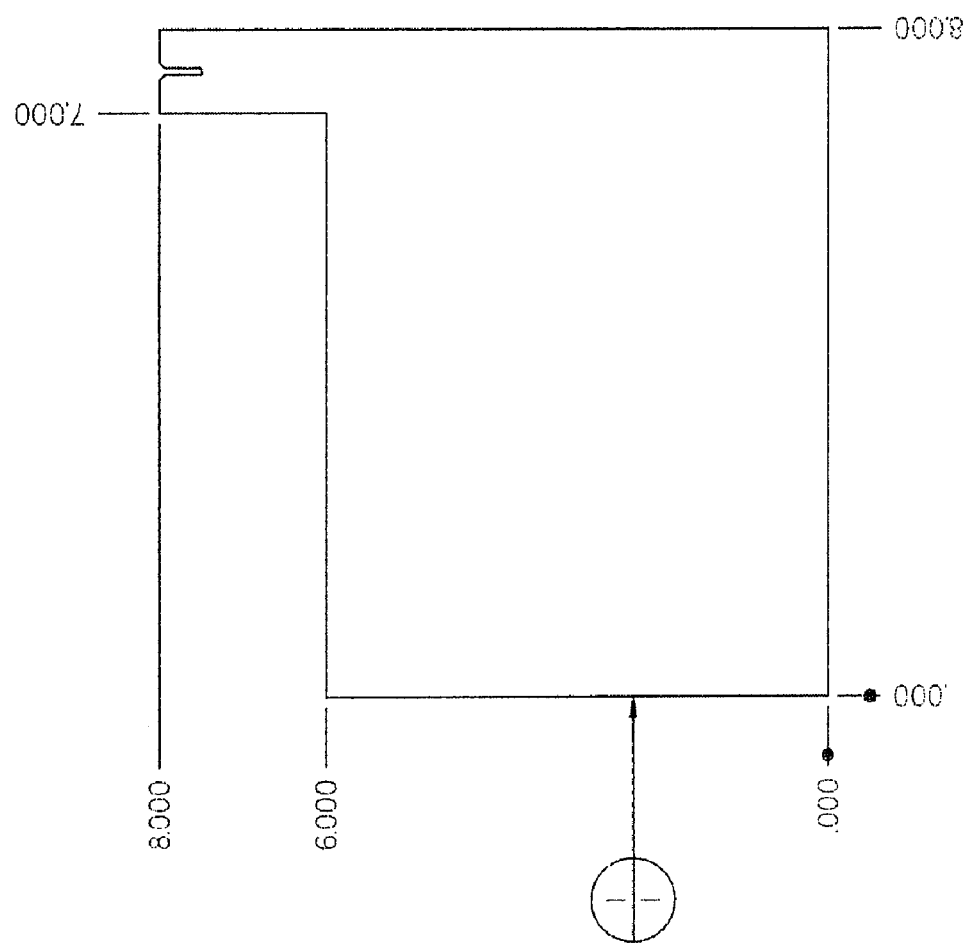

What is claimed is:

1. An apparatus for generating hydrogen comprising:
   a battery;
   an airtight, watertight container housing at least one cell;
      the said cell a plurality of plates, each formed from a single material, and each plate of the plurality of plates arranged in parallel to each other to form a row, the plurality of plates including;
      a positive plate having a first side and a second side connected to a positive terminal of the battery disposed at the center of the row;
      a first double plate assembly having a first negative and a second negative plate having a spacing of 0.125 inches there between, connected to a negative terminal of the battery and disposed at a first extreme end of the row;
      a second double plate assembly having a first negative and a second negative plate having a spacing of 0.125 inches there between, connected to a negative terminal of the battery and disposed at a second extreme end of the row;
      a first set of three one piece electrically isolated neutral plates disposed between the first side of the positive plate and the first double plate assembly;
      a second set of three one piece electrically isolated neutral plates disposed between the second side of the positive plate and the second double plate assembly;
      wherein water in an electrolytic solution introduced into the cell is converted to hydrogen gas for use in a gas or diesel combustion engine.

2. The apparatus for generating hydrogen of claim 1, in which the electrolytic solution is water mixed with potassium hydroxide.

3. The apparatus for generating hydrogen of claim 1, in which the positive plate is stainless steel.

4. The apparatus for generating hydrogen of claim 1, in which the negative plate is stainless steel.

5. The apparatus for generating hydrogen of claim 1, in which the neutral plate is stainless steel.

6. The apparatus for generating hydrogen of claim 1, in which the negative first and second plate are perforated.

7. The apparatus for generating hydrogen of claim 6, in which the perforations are circular.

8. The apparatus for generating hydrogen of claim 1, in which the spacing of 0.125 inches is maintained by a plurality of bosses disposed in at least one of the plates.

9. The apparatus for generating hydrogen of claim 1, further comprising a water bubbler to prevent flashback from an engine backfire.

10. The apparatus for generating hydrogen of claim 1, in which the neutral plates are spaced one half inch from each other.

11. The apparatus for generating hydrogen of claim 1, in which the airtight, watertight container housing contains three cells.

12. The apparatus for generating hydrogen of claim 1, in which the neutral plate is formed from a single piece of stainless steel and is not connected to ground, and is not connected to the positive battery terminal.

13. A method of hydrogen gas generation comprising:
  filling an enclosed container with an electrolyte solution;
  disposing an at least one cell in the enclosed container;
  passing a dc current through the at least one cell, where the at least one cell includes;
    a positive solid stainless stainless steel plate having a first side and a second side disposed in a box and electrically isolated from the box;
    two sets of three neutral solid stainless steel plates with a first set of the two sets of three neutral plates disposed on the first side of the positive stainless steel plate, and a second set of the two sets of three neutral plates disposed on the second side of the positive stainless steel plate, with each of the three plates in each of the two sets of neutral plates electrically isolated from every other plate; and
    two sets of two ground plates wherein each plate in the set of two ground plates is separated from the other by a fixed distance of 0.125 inches, and each plate in the set of two ground plates is electrically coupled;
  generating hydrogen gas from the circuit formed the cell and the electrolyte solution;
  collecting the hydrogen gas; and
  injecting the gas in a manifold of an internal combustion engine to increase its efficiency and reduce its carbon emissions.

14. The method of hydrogen gas generation of claim 13 further comprising bubbling the hydrogen gas through a bubbler to prevent flashback.

15. The method of hydrogen gas generation of claim 13 in which each plate of the two sets of ground plates has circular apertures disposed therein.

16. The method of hydrogen gas generation of claim 13, in which the electrolyte solution is potassium hydroxide.

* * * * *